United States Patent
Jagadish et al.

(10) Patent No.: US 10,761,776 B2
(45) Date of Patent: Sep. 1, 2020

(54) METHOD FOR HANDLING COMMAND IN CONFLICT SCENARIO IN NON-VOLATILE MEMORY EXPRESS (NVME) BASED SOLID-STATE DRIVE (SSD) CONTROLLER

(71) Applicant: SAMSUNG ELECTRONICS CO., LTD., Suwon-si, Gyeonggi-do (KR)

(72) Inventors: Chandrashekar Tandavapura Jagadish, Bangalore (IN); Abhinav Kumar Singh, Bangalore (IN); Vikram Singh Shekhawat, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 81 days.

(21) Appl. No.: 16/107,985

(22) Filed: Aug. 21, 2018

(65) Prior Publication Data

US 2019/0317696 A1  Oct. 17, 2019

(30) Foreign Application Priority Data

Apr. 13, 2018 (IN) .............................. 201841014241

(51) Int. Cl.
*G06F 3/06* (2006.01)

(52) U.S. Cl.
CPC .......... *G06F 3/0659* (2013.01); *G06F 3/0617* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | |
|---|---|---|
| 6,490,635 B1 | 12/2002 | Holmes |
| 8,321,639 B2 | 11/2012 | Lund et al. |
| 8,635,379 B2 | 1/2014 | Yun et al. |
| 9,116,625 B2 | 8/2015 | Palmer |
| 9,459,810 B2 | 10/2016 | Benisty et al. |
| 2015/0253992 A1 | 9/2015 | Ishiguro et al. |
| 2019/0079817 A1* | 3/2019 | Tomlin ................ G06F 11/1441 |

FOREIGN PATENT DOCUMENTS

JP           2012063875 A       3/2012

* cited by examiner

*Primary Examiner* — Idriss N Alrobaye
*Assistant Examiner* — Dayton Lewis-Taylor
(74) *Attorney, Agent, or Firm* — Volentine, Whitt & Francos, PLLC

(57) ABSTRACT

A method for handling a command ID conflict in an NVMe-based solid-state drive (SSD) device includes fetching, from a host submission queue (HSQ), one or more commands submitted by a host device. The fetched commands are checked to determine if there is a command ID conflict. A command ID (CID) error interrupt is communicated to firmware of the SSD device if the command ID conflict is detected. A command validation is performed for the one or more commands on receiving the CID error interrupts. A command response is communicated with additional special information from the device FW to the host device for a command having a command ID conflict. One or more resources associated with the one or more commands are released based on the command response.

8 Claims, 7 Drawing Sheets

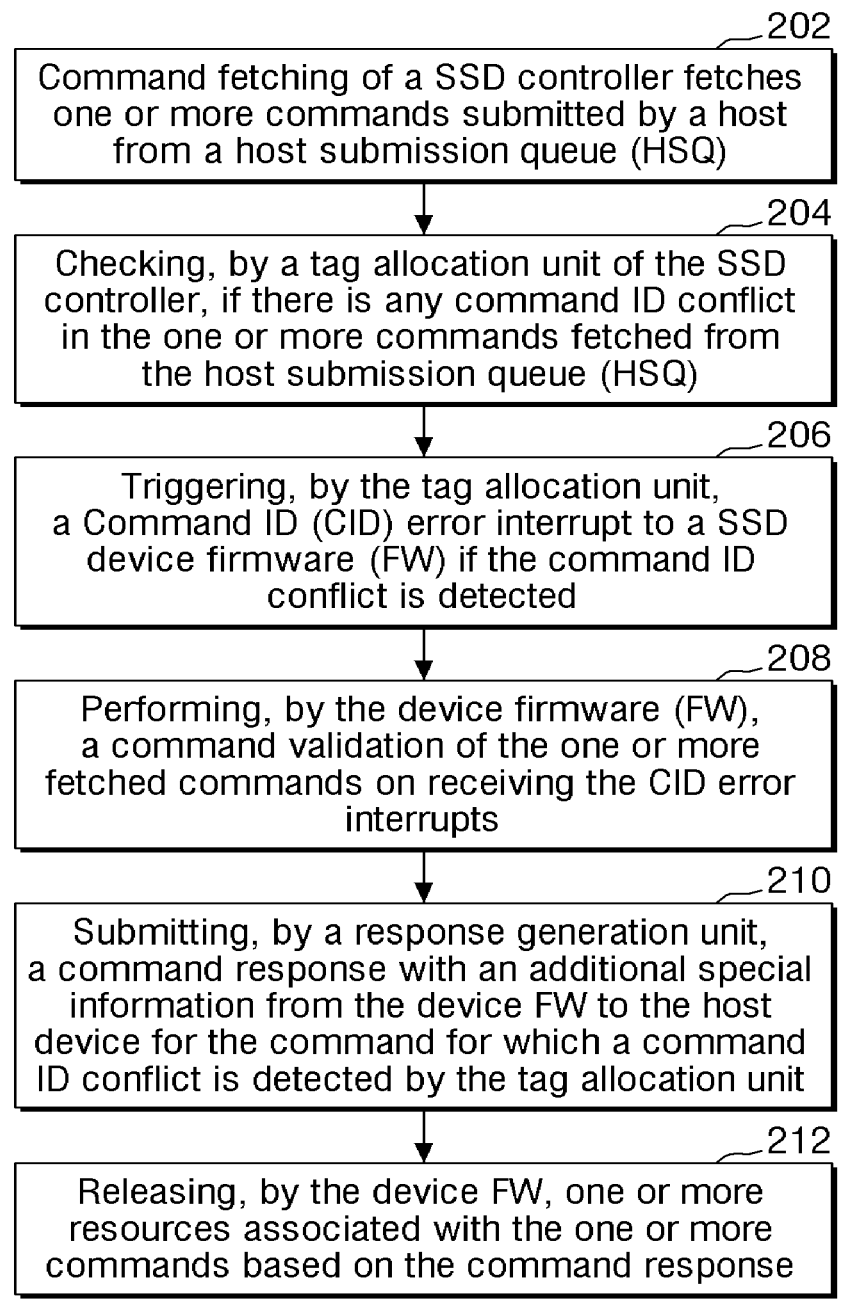

METHOD FOR HANDLING COMMAND IN CONFLICT SCENARIO IN NON-VOLATILE MEMORY EXPRESS (NVME) BASED SOLID-STATE DRIVE (SSD) CONTROLLER

CROSS-REFERENCE TO RELATED APPLICATIONS

This application claims priority under 35 U.S.C. § 119 to Indian Patent Application No. 201841014241 filed on Apr. 13, 2018, in the Indian Intellectual Property Office, the disclosure of which is incorporated by reference herein in its entirety.

FIELD

The embodiments herein generally relate to storage systems/solid-state drives (SSD) and more particularly relate to a method for handling a command identifier (ID) conflict scenario in a bare-metal multi-core Peripheral Component Interconnect Express (PCIe) based solid-state drive (SSD).

BACKGROUND

An entity, which is able to interact with a controller by sending commands as per Non-Volatile Memory Express (NVMe) specifications, can be termed a Host. The NVMe or Non-Volatile Memory Host Controller Interface Specification (NVMHCI) is a logical device interface specification for accessing non-volatile storage media attached through a Peripheral Component Interconnect Express (PCIe) bus. A controller is associated with a single PCIe function that can process the commands and can send an appropriate response to the host as per the NVMe specification.

FIG. 1A is a schematic block diagram of a standard device and host interface 100 illustrating various components, according to related art. According to FIG. 1A, the host interface 100 comprises an NVMe storage device 102 acting as an SSD controller, a host 104, and an application 114 running on a user space. The host 104 and the NVMe device 102 interact with each other over a PCIe bus in a kernel space. The host 104 comprises an NVMe MiniPort driver 106, a windows storport driver 108, a windows class driver 110, and an input/output (IO) manager 112. Further, the host 104 runs one or more applications 114 in the user space.

FIG. 1B is a schematic diagram 120 illustrating interaction between a host 122 and controller 124, according to related art. According to FIG. 1B, the host 122 and the controller 124 interact with each other over a PCIe bus (not shown in the figure). A plurality of processes will be running on the host 122. The host 122 maintains queues for submitting the command and monitoring the status of each submitted command. The host 122 maintains an administrative submission queue and an administrative completion queue for submitting administrative commands, for execution, and reaping the outcomes that are completed by the controller 124, respectively. Further, the host 122 maintains I/O submission queue 1 and I/O completion queue 1, I/O submission queue 2 and I/O completion queue 2, I/O submission queue N and I/O completion queue N for monitoring a plurality of I/O commands/ requests received from the plurality of applications running on the host 122.

Solid-state drives (SSDs), including NAND flash memory, are commonly used as a storage entity in systems ranging from consumer products to enterprise-level computer systems. The NVMe host controllers in some SSDs often manage high-throughput data traffic between one or more hosts. A host controller interface standard, such as non-volatile memory expresses (NVMe), allows a large number of tasks to be performed in an out-of-order fashion. This may present a challenging problem for multi-core host controller SSDs.

According to NVMe specifications, an NVMe-based host controller should support the detection of a command ID conflict. A command ID conflict situation arises in an NVMe compliant SSD when more than one command with same command ID comes to the processing scope before the processing of a previously-submitted command gets completed. In such scenarios, the NVMe specification mandates processing the previous command with due merits and processing the rest of the commands, which have the same command with the same command identifier, with a conflict error.

Since in a completion entry only a submission queue (SQ) identifier (ID) and a command ID are present, it is impossible for a host to distinguish for which command a successful response has come and for which command a command ID conflict error response has been reported by the controller. As a consequence of this, it will be difficult for the host to release the corresponding resources associated with the command based on the response. For the proper release of the resources, the host has to wait until it receives completions for all the commands.

SUMMARY

The various embodiments disclose a method for handling a command identifier conflict scenario in a non-volatile memory express (NVMe)-based solid-state drive (SSD) controller. The various embodiments also disclose a system and method for an efficient command ID conflict detection and handling in a multi-core Peripheral Component Interconnect Express (PCIe) based solid-state drive (SSD).

According to an embodiment of the present disclosure, a method for handling a command ID conflict in an NVMe-based solid-state drive (SSD) device includes: (1) fetching, by a command fetching unit of a SSD controller, one or more commands submitted by a host device from a host submission queue (HSQ), (2) checking, by a tag allocation unit of the SSD controller, if there is any command ID conflict in the one or more commands fetched from the host submission queue (HSQ), (3) triggering, by the tag allocation unit, a command ID (CID) error interrupt to a SSD device firmware (FW) if the command ID conflict is detected, (4) performing, by the device firmware (FW), a command validation of the one or more fetched commands on receiving the CID error interrupt, (5) submitting, by response generation unit, a command response with additional special information from the device FW to the host device for the command for which a command ID conflict is detected by the tag allocation unit, and (6) releasing, by the device FW, one or more resources associated with the one or more commands based on the command response.

According to another embodiment of the present disclosure, an NVMe-based solid-state drive (SSD) device for handling command ID conflict includes: (1) a command fetching unit adapted for fetching one or more commands submitted by a host to a host submission queue (HSQ), (2) a tag allocation unit adapted for: (a) checking if there is any command ID conflict in the fetched one or more commands from the host submission queue (HSQ) and (b) triggering a command ID (CID) error interrupt to SSD device if the command ID conflict is detected, (3) device firmware (FW) adapted for performing a command validation of the one or more fetched commands on receiving the CID error interrupts, and (4) a response generation unit adapted for submitting a command response with additional special information from the device FW to the host for the command for which a command ID conflict is detected by the tag allocation unit.

BRIEF DESCRIPTION OF THE DRAWINGS

The embodiments of this disclosure are illustrated in the accompanying drawings, throughout which like reference letters indicate corresponding parts in the various figures. The embodiments herein will be better understood from the following description with reference to the drawings, in which:

FIG. 2 is a schematic flow diagram illustrating a method for handling a command ID conflict in an NVMe-based solid-state drive (SSD) device, according to an embodiment of the disclosure.

DETAILED DESCRIPTION

Figure 1A:
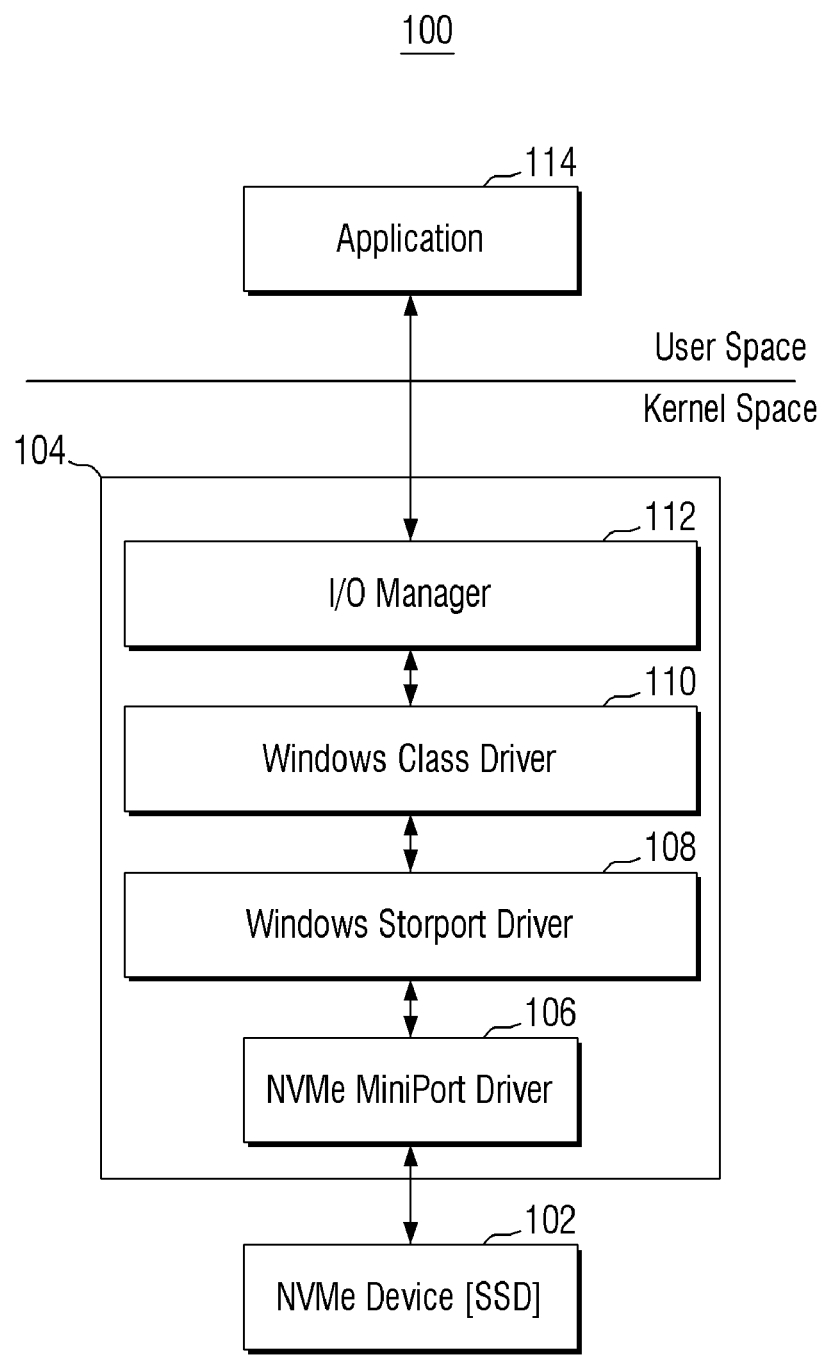
FIG. 1A is a schematic block diagram of a host & device interface illustrating various components, according to related art.
Figure 1B:
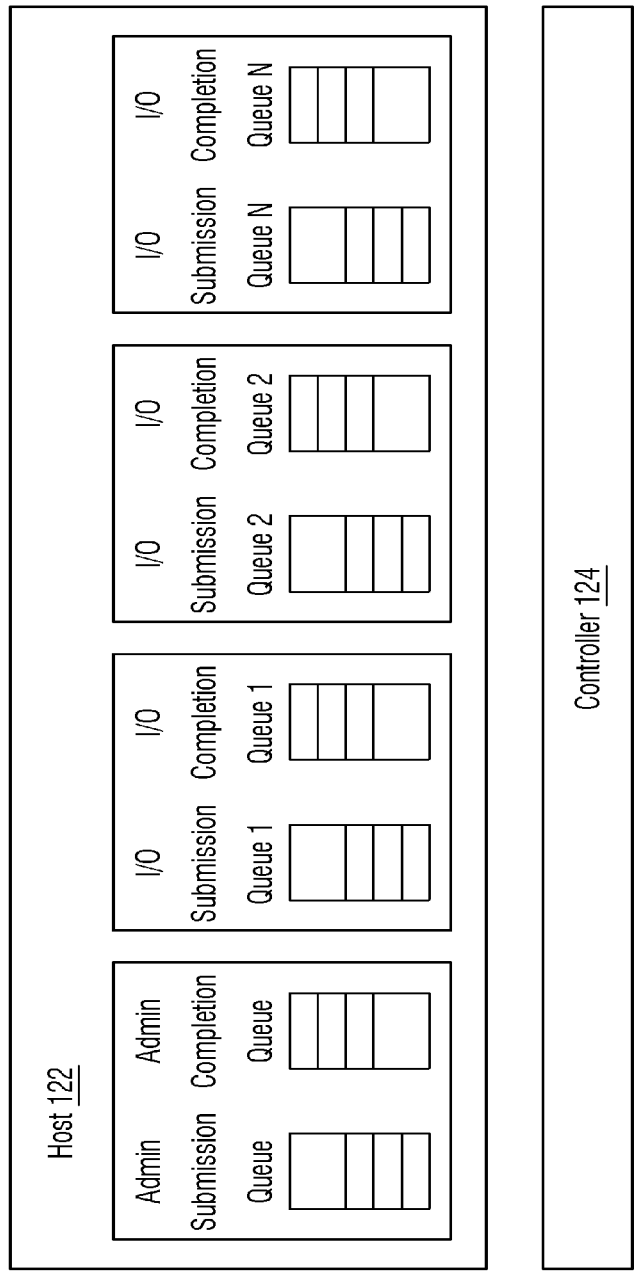
FIG. 1B is a schematic diagram illustrating interaction between a host and controller, according to related art.

The disclosure provides a method for handling a command ID conflict scenario in a non-volatile memory express (NVMe)-based solid-state drive (SSD) controller. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

According to an embodiment of the present disclosure, a method for handling a command ID conflict scenario in a non-volatile memory express (NVMe)-based solid-state drive (SSD) controller is described herein.

According to the disclosure, the method comprises fetching, by a command fetching unit of an SSD controller, one or more commands submitted by a host in a host submission queue (HSQ). The host has one or more commands that need to be executed by the SSD controller, wherein the commands are present in the host submission queue (HSQ). The host transmits a notification to the SSD controller in the form of a doorbell ring indicating the presence of commands in the HSQ for execution. In an embodiment of the disclosure, any notification message can be used for informing the SSD controller, without departing from the scope of the disclosure. Upon identifying that there are commands in need of execution, the command fetching unit of the SSD controller accesses the host submission queue (HSQ) and fetches one or more commands present in the HSQ.

Further, the method comprises checking, by a tag allocation unit of the SSD controller, if there is any command ID conflict in the one or more commands fetched from the host submission queue (HSQ). Upon fetching one or more commands, the command fetching unit transmits the fetched commands to the tag allocation unit of the SSD controller. The tag allocation unit receives the one or more commands and checks whether there is any command ID conflict between one or more commands fetched from the HSQ, as no two commands can have the same command ID during the scope of command execution.

Further, the method comprises the tag allocation unit triggering a command ID (CID) error interrupt to SSD device firmware (FW), if the command ID conflict is detected. If there is a command ID conflict with any of the commands fetched from the HSQ, the commands will be allocated with resources and executed therein after. If any command ID conflicts are identified by the tag allocation unit, then the tag allocation unit informs the device firmware (FW) of them. Upon identifying the presence of a command ID conflict, the tag allocation unit triggers a command ID (CID) error interrupt to the SSD device firmware (FW).

Further, the method comprises the device firmware (FW) performing a command validation of the one or more fetched commands upon receiving the CID error interrupts. Upon triggering the command ID (CID) error interrupt by the tag allocation unit to the SSD device FW, the SSD device FW performs a command validation of the one or more fetched commands upon receiving the CID error interrupts. In an embodiment of the present invention, performing the command validation by the device FW comprises of the device FW comparing the one or more fetched commands to determine a first difference between the commands having a same command ID and from the same host submission queue and the queue slot information of the command from which command is fetched.

Further, the method comprises a response generation unit submitting a command response with additional special information from the SSD device FW to the host for the command for which a command ID conflict is detected by the tag allocation unit. Upon performing the command validation, the SSD device FW provides additional special information along with the command response for performing validation to the response generation unit. The response generation unit submits the command response along with additional special information to the host for the command for which a command ID conflict is detected.

Further, the method comprises the SSD device FW releasing one or more resources associated with the one or more commands based on the command response. Based on the performed validation and obtained command response, the SSD device FW identifies the resources associated with commands for which a CID conflict has been detected and a CID error interrupt is triggered. Based on the command response, the SSD device FW releases one or more resources associated with the one or more commands for which command ID conflict is detected.

In an embodiment of the disclosure, the method further comprises skipping processing of the command in the SSD device FM for which the command ID conflict is detected, as the necessary handling is done during the interrupt handling that came as part of CID conflict detection.

In another embodiment of the disclosure, the method further comprises the SSD device FW processing the fetched one or more commands, if the command is correct in syntax and no command ID conflict is detected by the SSD controller.

In another embodiment of the disclosure, the method further comprises the SSD device FW entering command slot information in a completion entry, once the command is processed.

In another embodiment of the disclosure, the method further comprises the SSD device FW releasing one or more hardware resources associated with the command as part of a completion entry posting, once the command is processed.

According to another embodiment of the disclosure, an NVMe-based solid-state drive (SSD) device for handling a command ID conflict comprises a command fetching unit, a tag allocation unit, SSD device firmware (FW), and a response generation unit. According to the present disclosure, the command fetching unit is adapted for fetching one or more commands submitted by a host to a host submission queue (HSQ).

Further, the tag allocation unit of the SSD device is adapted for checking if there is any command ID conflict in the fetched one or more commands from the host submission queue (HSQ). Further, the tag allocation unit is adapted for triggering a command ID (CID) error interrupt to SSD device firmware if the command ID conflict is detected. Further, the SSD device FW is adapted for performing a command validation of the one or more fetched commands upon receiving the CID error interrupts.

Further, the response generation unit of the SSD device is adapted for submitting a command response with additional special information from the SSD device FW to the host for the command for which a command ID conflict is detected by the tag allocation unit. Further, the SSD device FW is adapted for releasing one or more resources associated with the one or more commands based on the command response.

FIG. 2 is a schematic-flow diagram 200 illustrating a method for handling a command ID conflict in an NVMe-based solid-state drive (SSD) device, according to an embodiment of the disclosure. According to the flow diagram 200, at step 202, a command fetching unit of an SSD controller fetches one or more commands submitted by a host from a host submission queue (HSQ). Further, at step 204 a tag allocation unit of the SSD controller checks if there is any command ID conflict in the one or more commands fetched from the host submission queue (HSQ). Further, at step 206 the tag allocation unit triggers a command ID (CID) error interrupt to SSD device firmware (FW) if the command ID conflict is detected.

Further, at step 208 the SSD device firmware (FW) performs a command validation of the one or more fetched commands upon receiving the CID error interrupt(s). Further, at step 210 a response generation unit submits a command response with additional special information from the SSD device FW to the host device for the command for which a command ID conflict is detected by the tag allocation unit. Further, at step 212 the SSD device FW releases one or more resources associated with the one or more commands based on the command response.

Figure 3:
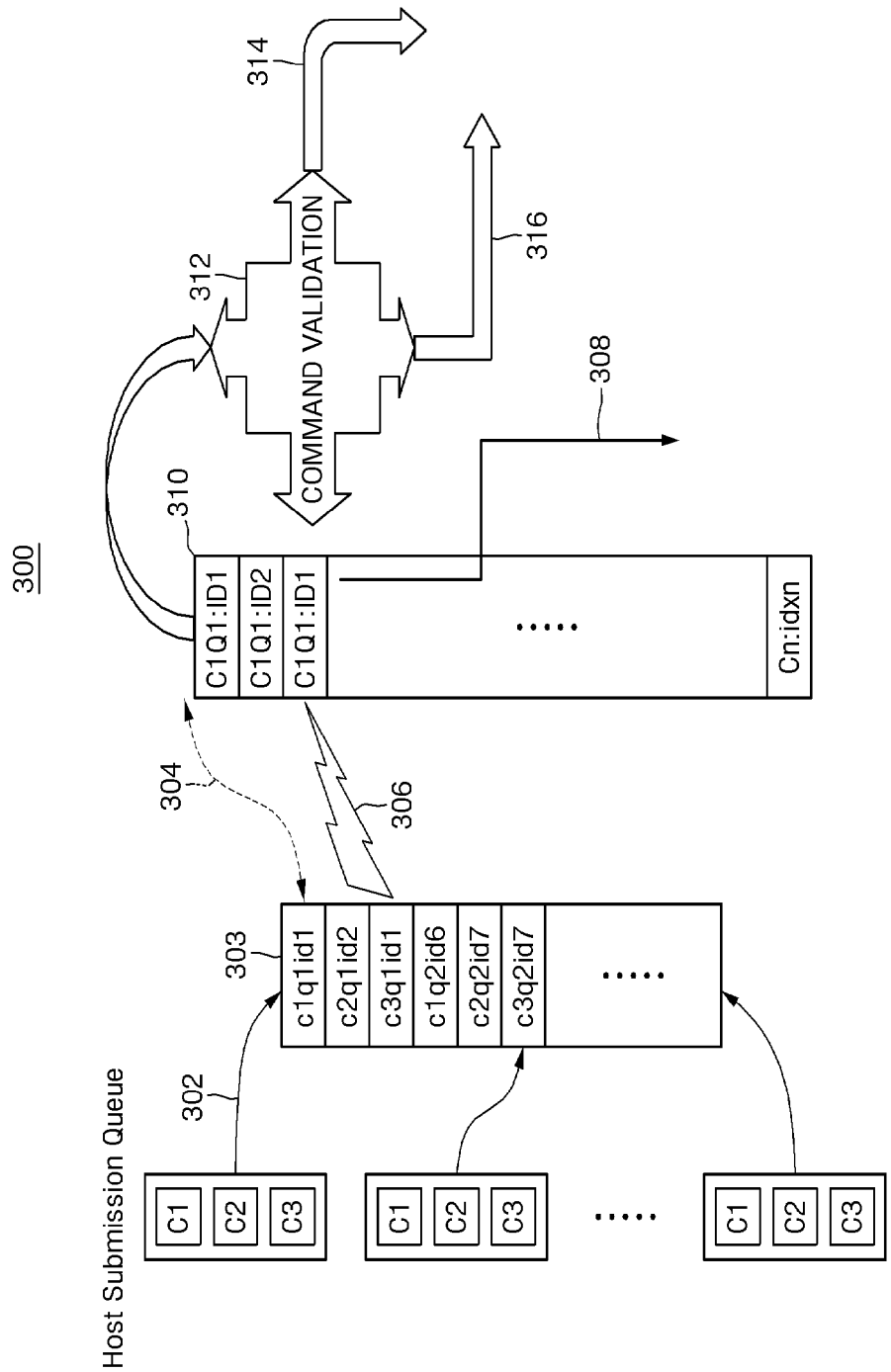
FIG. 3 is schematic diagram illustrating a method for handling a command ID conflict scenario in a non-volatile memory express (NVMe)-based solid-state drive (SSD) controller using a resource release approach, according to an embodiment of the disclosure.

FIG. 3 is schematic diagram 300 illustrating a method for handling a command ID conflict scenario in a non-volatile memory express (NVMe)-based solid-state drive (SSD) controller using a resource release approach, according to an embodiment of the disclosure. FIG. 3 illustrates an intelligent resource release approach for one or more commands upon finding that the there is an occurrence of a command ID conflict.

According to the schematic diagram 300, at 302 one or more commands associated with one or more applications running on a host are stored in a host submission queue (HSQ). The host sends a message to the SSD controller along with a doorbell ring indicating the presence of commands that need to be executed. Upon receiving the doorbell ring indication from the host, the commands can be fetched by a command fetching unit of an SSD device.

Further, at step 304, a tag allocation unit (303) identifies the received one or more commands from the HSQ and checks a command ID (CID) of one or more commands received. The tag allocation unit (303) checks for the command ID of one or more commands to identify if there is any occurrence of a command ID conflict in the received commands and their command IDs, such that two or more commands have the same command ID.

Further, at step 306 the tag allocation unit(303) identifies that there is an occurrence of a command ID conflict among the received commands from the HSQ and thus identifies the commands for which there is an occurrence of a command ID conflict and thus triggers a command ID (CID) error interrupt to SSD device firmware (FW). The interrupt is triggered to alert the SSD device FW about an occurrence of the conflict and efficient handling of the same.

Further, at step 308 the SSD device FW receives the command ID error interrupt as a command ID conflict notification and handles the command ID error interrupt as a special case. During handling of the command ID error interrupt, the SSD device FW performs command validation, wherein the SSD device FW compares commands, for instance from DW0 to DW15, for the first difference between the commands which have same command ID from the same HSQ. While comparing for the first difference, the first mismatched DW location will be given in DW0 of the CQ entry and the content of it is given in DW1 of a command request queue (CQ) entry for the command which will be reported with a command ID conflict error. Also, the DW0 contains the slot information in the queue (Q) from which the command got fetched. Upon identifying the first difference, the SSD device FW generates a response along with additional information for the command for which a command ID conflict is detected. A response generation unit transmits the response generated by the SSD device FW to the host, wherein the response comprises additional information for the command for which the command ID conflict is detected.

Further, at step 310 the SSD device FW marks the command for which the response is already sent so that it can be skipped when it comes for normal processing in the SSD device FW. Further, at step 312 the SSD device FW processes the incoming command based on the merit of the command. Further, at step 314 if the command is correct in syntax and no error is marked by the SSD device FW, then the command is forwarded to a next hardware unit and SSD device FW pipeline stages for command processing. But, if the command is marked with a command ID error and an interrupt has been triggered for the same, then at step 316 the SSD device FW skips its processing as a response is sent in the much earlier stage as part of the interrupt. Further, the SSD device FW releases one or more resources associated with the one or more commands based on the command response.

Figure 4:
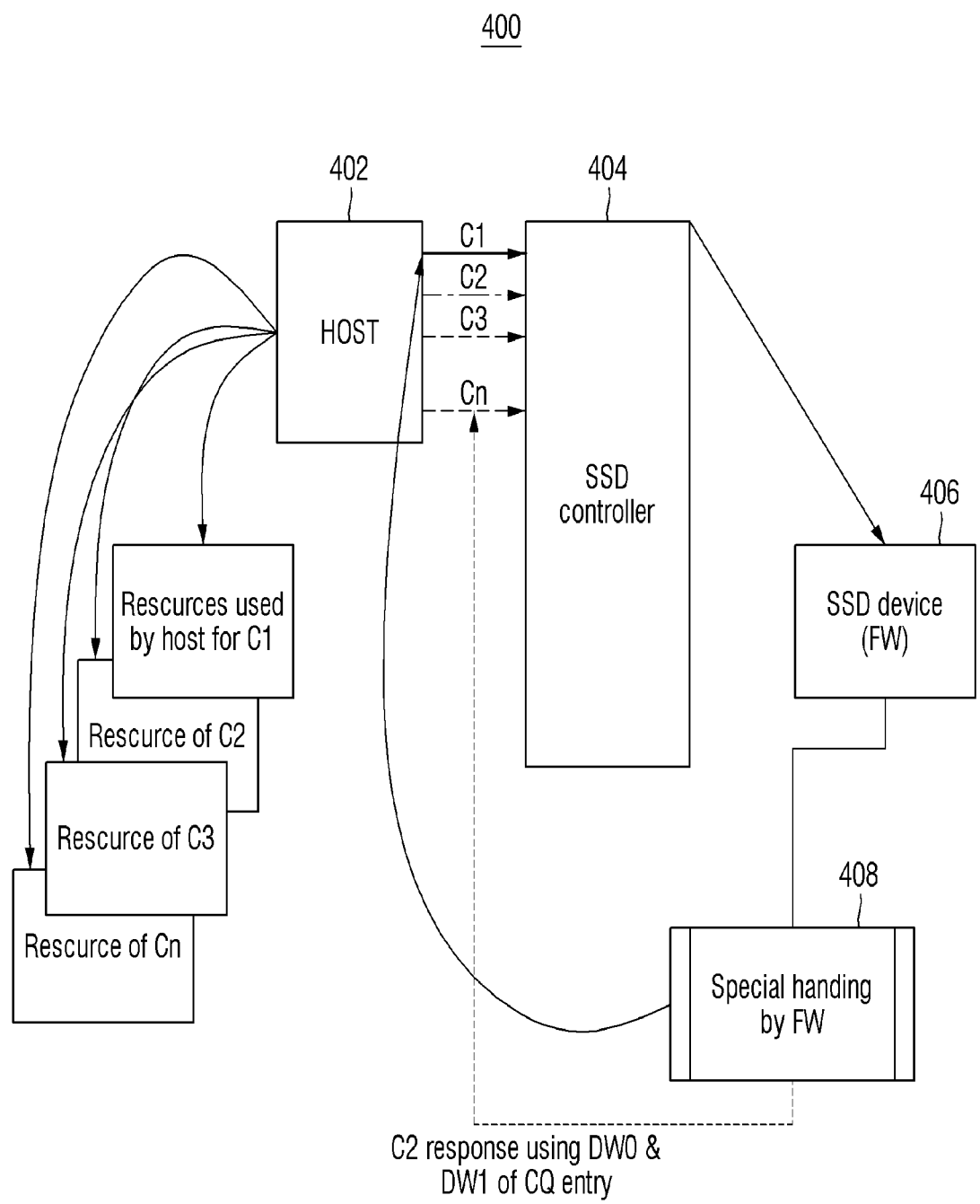
FIG. 4 is a schematic diagram illustrating efficient command ID conflict handling flow in an NVMe controller and a resource-handling mechanism of a host, according to an embodiment of the disclosure.

FIG. 4 is a schematic diagram 400 illustrating an efficient command ID conflict handling flow in an NVMe controller and a resource handling mechanism of host, according to an embodiment of the disclosure. According to diagram 400, one or more applications are running on a host 402, wherein one or more commands C1, C2, C3 . . . Cn are being received and stored in a host submission queue (HSQ). For each of the commands C1, C2, C3, . . . Cn, the host device 402 reserves pre-determined resources for execution of the commands. The host 402 notifies SSD controller 404 about commands C1, C2, C3, . . . Cn that need to be processed via a doorbell ring.

The SSD controller 404 receives the commands and a tag allocation unit (not shown in the Figure) of the SSD controller 404 checks whether there is any conflict with command IDs of the received commands. Upon checking, the tag allocation unit identifies that command C1 is having conflict, and thus triggers a command ID error interrupt and notifies SSD device firmware (FW) 406 about the presence of a command ID (CID) conflict in the received command C1. Upon receiving the command ID conflict, the SSD device FW 406 processes the command C1. Based on the checking, the SSD device FW 406 performs special handling of the command 408, wherein the SSD device FW generates a response for the command C1, which comprises special additional information.

The SSD device FW 406 transmits the response along with additional information to a response generation unit (not shown in the Figure) of the SSD controller 404 that transmits the response to the host 402. The host 402 receives the response along with additional information. Also, the host 402 receives information about the other commands for which SSD device FW 406 has given clear information that no conflict has been detected. Upon receiving the same, the host 402 releases the resources allocated for command C1 for which the conflict is identified and allocates resources to other commands C2, C3, . . . Cn.

In related art methods, a host allocates memory for each command which it submits to a device. In related art methods, a host device cannot release associated resources with the commands until the host gets responses for all the commands which have the same command ID from the same submission queue (SQ).

In the present disclosure, a command ID conflict scenario is handled by providing all the necessary information to a host so as to clear allocated resources. When the host device examines the completion queue (CQ) entry for a command ID conflict error response, it can use the data of DW0 and DW1 and can release the associated resources occupied by the command. With the present method, starvation in memory because of the resource occupancy at host side is avoided. Further, the present method can efficiently handle command ID conflict scenarios in any of the NVMe devices.

Figure 5:
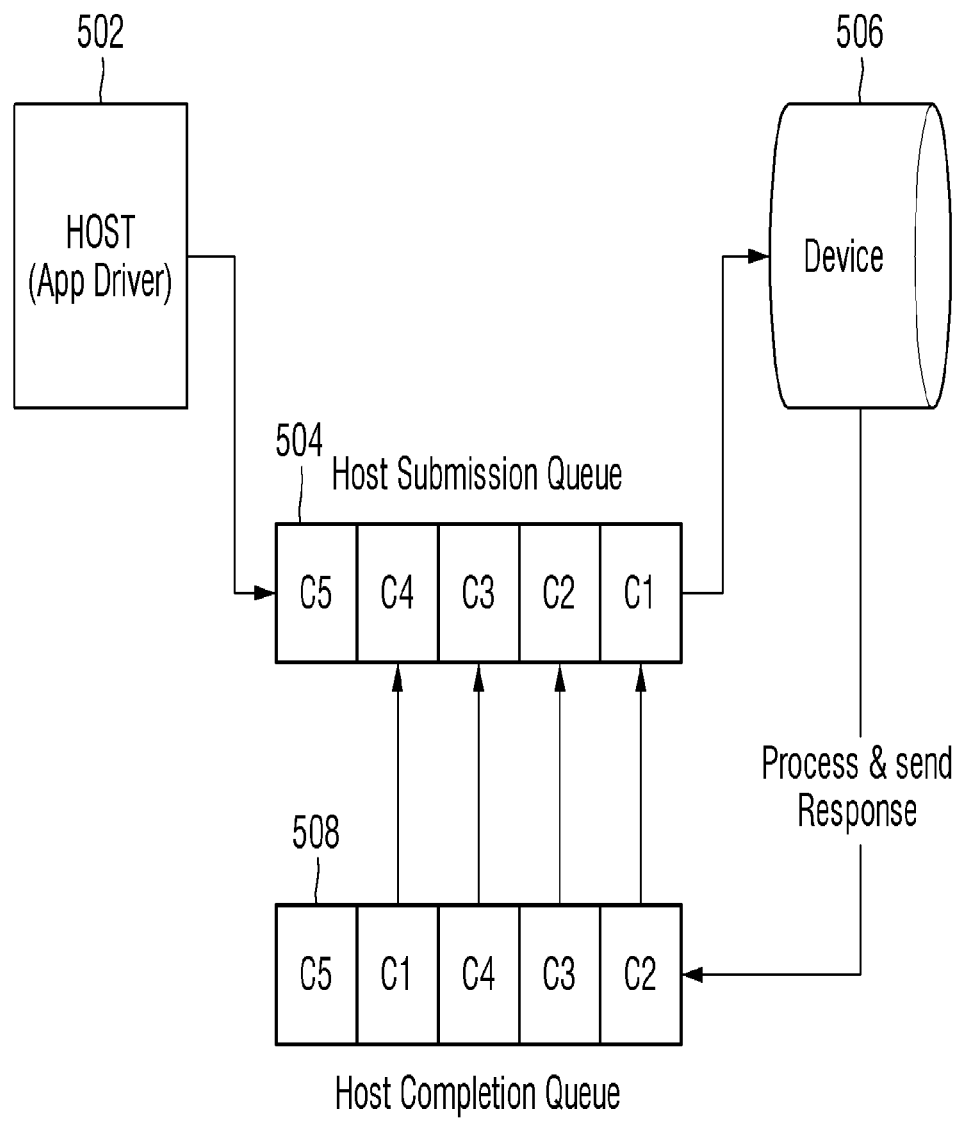
FIG. 5 is a schematic diagram illustrating handling of a possible issue that can occur while handling a command ID conflict scenario, according to an embodiment of the disclosure.

FIG. 5 is a schematic diagram 500 illustrating handling an issue that can occur during handling a command ID, according to an embodiment of the disclosure. According to the diagram 500, a host 502 has commands C1, C2, C3, C4, and C5 and thus submits the commands to a host submission queue (HSQ) 504. A device 506 fetches the commands C1, C2, C3, C4, and C5 from the HSQ 504 and checks whether there are any conflicts in the command IDs (CIDs) of fetched commands.

Upon checking device 506 identifies that commands C2, C3, and C4 have command IDs conflicting with a command ID of C1. Based on the identified CID conflicts, device firmware (FW) of the device 506 receives the commands and processes the commands C1, C2, C3, C4, and C5. Upon processing the commands C1, C2, C3, C4, and C5, the device 506 prepares a response for each of the processed commands and put the responses in host completion queue (HCQ) 508. In the host completion queue (HCQ) 508, it can be observed that commands C2, C3, and C4 which are having conflicts and resources associated with them are released. Commands C1 and C5 are properly executed by the device 506.

Figure 6:
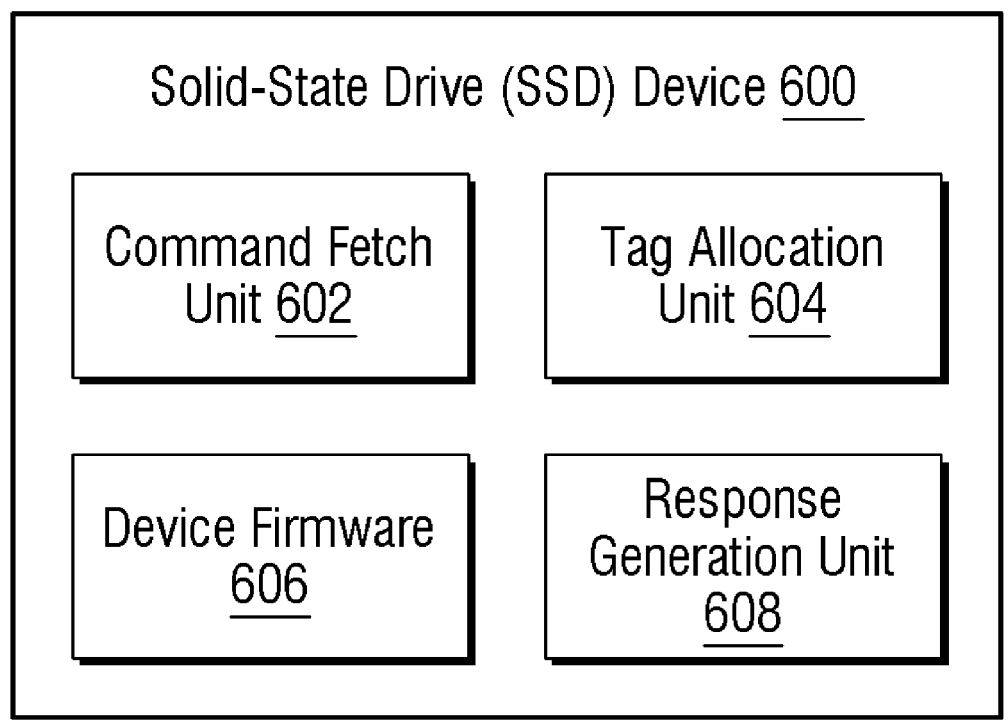
FIG. 6 is a schematic block diagram illustrating sub blocks of a device/solid-state drive (SSD) for handling a command ID conflict, according to an embodiment of the disclosure.

FIG. 6 is a schematic block diagram illustrating a device/solid-state drive (SSD) 600 for handling a command ID conflict, according to an embodiment of the disclosure. According to the diagram, the device 600 comprises a command fetch unit 602, a tag allocation unit 604, device Firmware (FW) 606, and a response generation unit 608.

According to the present disclosure, the command fetch unit 602 fetches one or more commands submitted by a host (not shown in Figure) to a host submission queue (HSQ). The commands from the host are stored in the HSQ and a doorbell ring message is transmitted to the SSD device 600 to inform SSD device 600 of the presence of commands in the HSQ. Upon receiving the doorbell ring, the command fetch unit 602 fetches one or more commands from the HSQ.

Further, the tag allocation unit 604 of the SSD device 600 checks if there is any command ID conflict in the one or more commands fetched from the host submission queue (HSQ). Upon identifying that there is a command ID conflict in the fetched commands, the tag allocation unit 604 triggers a command ID (CID) error interrupt to the device firmware (606).

Further, the device firmware 606 of the SSD device 600 performs a command validation of the one or more fetched commands on receiving the CID error interrupt triggered by the tag allocation unit 604. During processing/command validation, the device firmware 606 identifies which command is having a command conflict and based on the conducted validation, prepares a response and additional special information for the command which is having the command ID conflict.

Further, the response generation unit 608 of the SSD device 600 submits the response with additional special information from the device firmware 606 to the host for the command for which a command ID conflict is detected. Further, upon sending the response along with additional special information, the device firmware 606 releases one or more resources associated with the one or more commands which have a command ID conflict based on the command response.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

We claim:

1. A method for handling a command identification (ID) conflict in a non-volatile memory express (NVMe)-based solid-state drive (SSD) device, the method comprising:
    fetching, by a command fetching unit of an SSD controller, one or more commands submitted by a host to a host submission queue;
    checking, by a tag allocation unit of the SSD controller, if there is a command ID conflict in the one or more commands fetched from the host submission queue;
    triggering, by the tag allocation unit, a command ID (CID) error interrupt to a device firmware of the SSD device in response to detecting the command ID conflict for a first command among the one or more commands fetched from the host submission queue;
    performing, by the device firmware of the SSD device, a command validation of the one or more commands in response to receiving the CID error interrupt;
    submitting, by a response generation unit of the SSD device, a command response with additional special information, comprising host submission queue slot information, from the device firmware of the SSD device to the host, that has the command ID conflict for the first command; and
    releasing, by the device firmware of the SSD device, a resource associated with the one or more commands based on the command response,
    wherein performing the command validation by the device firmware of the SSD device comprises:
    comparing, by the device firmware of the SSD device, the one or more commands to determine a first difference between the commands having a same command ID and from a same host submission queue and the host submission queue slot information from which the one or more commands are fetched.

2. The method of claim 1, further comprising skipping processing of the first command.

3. The method of claim 1, further comprising processing, by the device firmware of the SSD device, each of the one or more commands in response to determining the command has correct syntax and no command ID conflict.

4. The method of claim 1, further comprising entering, by the device firmware of the SSD device, command host submission queue slot information for each of the one or more commands in a completion entry once the command is processed.

5. The method of claim 4, further comprising releasing, by the device firmware of the SSD device, each of one or more resources associated with the command in response to completing processing of the command.

6. A non-volatile memory express (NVMe)-based solid-state drive (SSD) device for handling a command identification (ID) conflict, the SSD device comprising:
    a command fetching unit that fetches one or more commands submitted by a host to a host submission queue in a device memory;
    a tag allocation unit that:
        checks whether a command ID conflict exists in the one or more commands fetched from the host submission queue, and
        triggers a command ID (CID) error interrupt to a device firmware of the SSD device in response to detecting the command ID conflict;
    the device firmware of the SSD device that, in response to the CID error interrupt, performs a command validation of each of the one or more commands fetched from the host submission queue; and
    a response generation unit of the SSD device that submits a command response with additional special information, which includes a host submission queue slot information, from the device firmware of the SSD device to the host for a first command, among the one or more commands, that has the command ID conflict,
    wherein performing the command validation comprises comparing, by the device firmware of the SSD device, the one or more commands to determine a first difference between the commands having a same command ID and from a same host submission queue and the host submission queue slot information from which the one or more commands are fetched.

7. The SSD device of claim 6, wherein the device firmware of the SSD device releases one or more resources associated with the one or more commands based on the command response.

8. The SSD device of claim 6, wherein the response generation unit skips processing of the first command.

* * * * *